2,923,659
PESTICIDAL COMPOSITION

George E. Ziegler and Laverne Paul Fotsch, Evanston, Ill., assignors to Zonolite Company, Chicago, Ill., a corporation of Montana No Drawing. Application July 19, 1956
Serial No. 598,748

1 Claim. (Cl. 167—42)

This invention relates to pesticidal compositions and more particularly to an insecticidal preparation comprising an insecticide and vermiculite.

Insecticide preparations used in the eradication and control of insects are generally associated with solid carriers, and are produced by mixing the insecticide itself with such carrier materials as clays, sawdust, ground corn cobs, powdered oyster shells and the like. There are however, a number of disadvantages associated with the use of such preparations. For example, when liquid insecticides are used for impregnating or coating carriers herewith, the liquid has a tendency to leach out, creating stains of the fluid under and around the area where the preparation has been applied. This is an important reason why such compositions cannot be used, e.g. on light colored painted floors, window sills and the like even though such areas are frequently otherwise the best depositories for the insecticide. Furthermore, the bulk density of the insecticide preparations conventionally used is so low that they are all too readily scattered by the wind and become dissipated over a larger area than may be desired.

It has now been found possible, in accordance with the present invention to produce an insecticidal preparation having not only a high bulk density, but also one which has a long-lasting killing effect, and is remarkably free of propensity to stain surfaces with which it is in contact.

Furthermore, the present invention permits the production of insecticidal preparations having a uniform insecticidal content, which is easy to handle, and the uniformity of whose insecticide content is easily controlled.

This invention proceeds on the discovery that insecticides can be incorporated into micaceous material, particularly, unexfoliated vermiculite, in such a way that the active insecticidal ingredient used is distributed uniformly, and primarily and substantially within the interstitial spaces of the vermiculite particles, with relatively small amounts on the outside of the pieces of vermiculite ore, to provide the novel and useful products of this invention.

The following detailed example will serve to illustrate a particularly successful embodiment of the invention, it being understood that this example is illustrative only and is not to be construed in a limiting sense.

Example I

An emulsion was formed by mixing together at room temperature (in parts by weight) 4 parts of water, 2 parts of malathion (o,o-dimethyl dithiophosphate of diethyl mercaptosuccinate), 2 parts of peanut oil and 2 parts of Emcol H-140 emulsifier (a mixture of non-ionic polyoxy ethers and anionic oil soluble sulfonates distributed by the Emulsol Corporation of Chicago, Ill.). The emulsion was then added to 100 parts of No. 2 South Carolina vermiculite ore and the material was thoroughly mixed.

After ageing for 48 hours, it was found that this mixture would not leave a stain on ordinary bond paper after a contact of 3 hours, and that the insecticidal effectiveness was unusually long-lasting.

In making up the emulsion the water content may, of course, vary over a considerable range, as those skilled in the art will appreciate: we have found an emulsion formed of 4 parts, or even more, of an insecticide which can form the "oil" phase of an oil-in-water emulsion, to from 2 to 6 parts of water works very well; the kind and amount of emulsifier will also, of course, be variable within the skill of the art. When peanut oil is in the emulsion it functions not only as an oil component of the resulting emulsion, but also acts as a "bait" for attracting insects—flies particularly—thereto.

The ratio of water, insecticide, or insectides dissolved in oil, and emulsifier, may, as above indicated, vary; the desideratum is a material in the form of an emulsion, preferably an oil-in-water emulsion, and the amount of such emulsion applied to the vermiculite should preferably be such that after mixing with the vermiculite particles and allowing the mixture to age for say about 24 to 48 hours, the resulting preparation, when placed on a piece of bond paper at room temperature will not stain the paper for, preferably, about three hours. While the ageing time is not particularly critical, we have found in practice that a 48 hour period is always quite adequate, and that many times even a 24 hour ageing period suffices.

Vermiculite ore is a unique material. Basically it is a crystalline substance, but unlike many other natural inorganic crystalline materials, the flaky ore particles are quite porous. Adsorption by gases such as nitrogen indicates that the internal surface area due to the presence of pores or interstices is in the order of 1 square meter per gram (and about 0.1 of an acre per pound). The absorption of insecticidal emulsions by unexfoliated vermiculite, such as is described herein, is undoubtedly due to the presence of these interstices or fissures within the vermiculite particles. The crystalline surface bounding these pores or fissures is, like the surface of most inorganic siliceous minerals, strongly hydrophilic in nature.

Thus, while the physical phenomena involved in producing the novel preparations of this invention are not completely understood, it appears as though the interstitial surfaces of the vermiculite ore have the characteristic of preferentially attracting the water component of the mix and that the oil and insecticide components of the mix are, in some fashion, drawn to these interstitial surfaces with the water and remain adsorbed thereon, resulting in the production of a substantially dry-to-the-touch preparation, and yet one whose insecticide content is in active, readily volatizable form so that it can function effectively without appreciably staining the outside surfaces of the ore or of the surface on which the preparation is placed and is in contact therewith.

The particle size of the vermiculite ore used and the particle size of the unexfoliated vermiculite is variable. For "salt shaker" application we have found that #4 vermiculite ore is quite satisfactory: the sieve analysis of such a material is as follows:

| Sieve, U.S. No. | Weight | |
|---|---|---|
| | Percent On | Cumulative per. cent |
| 30 | 2.7 | 2.7 |
| 50 | 86.4 | 89.1 |
| 100 | 10.1 | 99.2 |
| 200 | .5 | 99.7 |
| Pan | .3 | 100.0 |

Where a large heavy particle is needed to avoid any possibility of the pesticide being wind borne #2 ore may be used, this material having the following approximate sieve analysis:

| Sieve, U.S. No. | Weight | |
|---|---|---|
| | Percent On | Cumulative per. cent |
| 8 | 0.1 | 0.1 |
| 16 | 81.5 | 81.6 |
| 30 | 16.4 | 98.0 |
| 50 | 1.2 | 99.2 |
| 100 | 0.4 | 99.6 |
| Pan | 0.4 | 100.0 |

Nor is the invention limited to any particular insecticide since any insecticide selected, for example, from those illustrated by the compilation listed on pages 748, 749 and 750 of the 1952 Yearbook of Agriculture, as well as others, may be used provided that they can be put in the form of emulsions, preferably of the oil-in-water type, as hereinbefore described, with the assistance of a solvent oil for dissolving the insecticide if such is required, or even without such oil if the insecticide material itself is "oily" and capable of forming the oil component of an emulsion.

Other oils besides peanut oil can be used, as for example, cottonseed oil, soybean oil, mineral oils and the like which will provide emulsions of the character hereinbefore described. Odoriferous materials useful as "bait" may also be added if and when desired.

Among the emulsifiers that can be used in the preparation of the emulsion used in producing these novel insecticidal preparations are various non-ionic polyoxy ethers, anionic oil soluble sulfonates, mixtures thereof as well as functional equivalents, these being well known to those skilled in the art.

And since certain changes in the details of carrying out the above process and certain modifications in the article which embodies the invention may be made without departing from its scope, it is intended that all matter contained in the above descriptions shall be interpreted as illustrative and not in a limiting sense.

It is also to be understood that the following claim is intended to cover all of the generic and specific features of the invention herein described and all statements of the scope of the invention which as a matter of language might be said to fall therebetween.

We claim:

A method of producing an insecticidal product which comprises disposing within the interstitial spaces of 100 parts, by weight, of unexfoliated vermiculite, an emulsion comprising by weight, about 4 parts of water, about 2 parts of malathion, about 2 parts of peanut oil, and an emulsifier.

References Cited in the file of this patent

UNITED STATES PATENTS

| | | |
|---|---|---|
| Re. 24,184 | Sanders et al. | July 24, 1956 |
| 2,362,760 | Maxwell | Nov. 14, 1944 |
| 2,640,800 | Shatto | June 2, 1953 |
| 2,760,900 | Glenn et al. | Aug. 28, 1956 |

OTHER REFERENCES

"Zonolite Vermiculite, Chem. and Phys. Properties," Zonolite Co., Chicago, 1954, pp. 6, 9, 10, 11 and 12.

"Handbook of Insecticide Dust Diluents and Carriers," Dorland Books, Caldwell, N.J., 1955, pp. 96–100.

Frear: "Pesticide Handbook," College Sci., Publ., State Coll., Pa., 1954, p. 90.